US006865614B2

(12) United States Patent
Fischer et al.

(10) Patent No.: US 6,865,614 B2
(45) Date of Patent: Mar. 8, 2005

(54) METHOD FOR TRANSFERRING A PACKED DATA STRUCTURE TO AN UNPACKED DATA STRUCTURE BY COPYING THE PACKED DATA USING POINTER

(75) Inventors: Matthew Fischer, Richardson, TX (US); Thavatchai Makphaibulchoke, Arlington, TX (US); Subramanian Ramesh, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 809 days.

(21) Appl. No.: 09/897,349

(22) Filed: Jul. 2, 2001

(65) Prior Publication Data

US 2003/0014550 A1 Jan. 16, 2003

(51) Int. Cl.[7] .............................................. G06F 15/16
(52) U.S. Cl. ...................................... 709/246; 717/140
(58) Field of Search ......................... 395/185.01, 680;
711/114; 709/246, 213; 717/140; 710/8;
707/103, 4; 370/474

(56) References Cited

U.S. PATENT DOCUMENTS 5,809,302 A * 9/1998 Wang et al. ................. 717/117

OTHER PUBLICATIONS cs.umd.edu/class/spring2003/cmsc311/Notes/BitOp/cast.html.*
eskimo.com/~scs/cclass/int/sx4bb.html.*
Kaz Kylheku, "int pointer to int array", Jun. 17, 1997, comp.lang.c.*
Lawrence Kirby, "casting a pointer to an structure to an structure inside first", Dec. 14, 1996, comp.lang.c.*
David Woodman, "summary of obfuscated code request", Dec. 5, 1989, comp.lang.c.*
Jeffrey Turner, "Packing bit field and alignment", Jan. 21, 2001, comp.lang.c.*
Lars Henrik Mathiesen, "Type punning in C", Oct. 26, 1989, comp.lang.c.*

* cited by examiner

*Primary Examiner*—Meng-Al T. An
*Assistant Examiner*—Jennifer To
(74) *Attorney, Agent, or Firm*—Thomas M. Croft (57) ABSTRACT

Computer data is transferred from a packed to an unpacked data structure in a computer that enforces aligned memory access and for which the associated compiler lacks a compile-time directive to pack data structures. In an exemplary embodiment, the invention is employed in the pre-processing of Advanced Configuration and Power Interface (ACPI) tables stored in little-endian format for use by a big-endian operating system.

9 Claims, 9 Drawing Sheets

METHOD FOR TRANSFERRING A PACKED DATA STRUCTURE TO AN UNPACKED DATA STRUCTURE BY COPYING THE PACKED DATA USING POINTER

RELATED APPLICATIONS

The instant application is related to "Method for Pre-Processing a Data Collection for Use by a Big-Endian Operating System," Hewlett-Packard Company U.S. application Ser. No. 09/897348, and "Method for Reversing the Bits of a Computer Data Structure," Hewlett-Packard Company U.S. application Ser. No. 09/897346, now U.S. Pat. No. 6,388,586, both of which were filed on the same day as the instant application.

FIELD OF THE INVENTION

The present invention relates generally to computers and more specifically to methods for transferring computer data from a packed to an unpacked data structure.

BACKGROUND OF THE INVENTION

Some computer architectures such as the Intel-Architecture-64 (IA-64) strictly enforce aligned memory access, in which the address of a data object must be divisible by the size in bytes of the data object, subject to the further constraint that memory accesses must be performed in units of 1, 2, 4, or 8 bytes. Also, some computer programming languages recognize a compile-time directive to pack data structures. A packed data structure contains members of different sizes stored contiguously in memory, regardless of the word size of the machine. For example, a 16-bit integer followed by a 64-bit integer stored at contiguous, increasing byte addresses in an IA-64 computer is considered a packed data structure because the first member of the data structure, the 16-bit integer, is smaller than the word size (32 bits). Consequently, the 64-bit integer does not coincide with a 64-bit aligned address. The component parts of an unpacked data structure, on the other hand, are aligned with the word boundaries of the computer. An unpacked version of the foregoing example in an IA-64 machine would occupy two 64-bit words because a compiler would assign the 64-bit integer to an 64-bit aligned address. Therefore, 48 bits of the unpacked data structure between the 16-bit integer and the 64-bit integer are unused filler.

Not all compilers support the packing directive. When data stored in packed format must be read by program code compiled using a compiler that does not support packing on a computer that enforces aligned memory access, fatal run-time exceptions may occur. Specifically, a packed data structure may begin at a memory address that does not lend itself to aligned memory access. It is thus apparent that there is a need in the art for a method for transferring data from a packed to an unpacked data structure.

SUMMARY OF THE INVENTION

A method is provided for transferring computer data from a packed to an unpacked data structure. The invention may be implemented as program code stored on a computer-readable storage medium.

Other aspects and advantages of the present invention will become apparent from the following detailed description, taken in conjunction with the accompanying drawings, illustrating by way of example the principles of the invention.

DETAILED DESCRIPTION OF THE INVENTION

The invention will be described in the context of pre-processing ACPI tables for use by a big-endian operating system. However, the invention may be applied to any data collection stored in little-endian format for which unpacking, byte swapping, bit reversal, or a combination thereof are required to prepare the data collection for use by a big-endian operating system. Before the invention is described in detail, several key concepts will first be defined and explained.

Figure 1A:
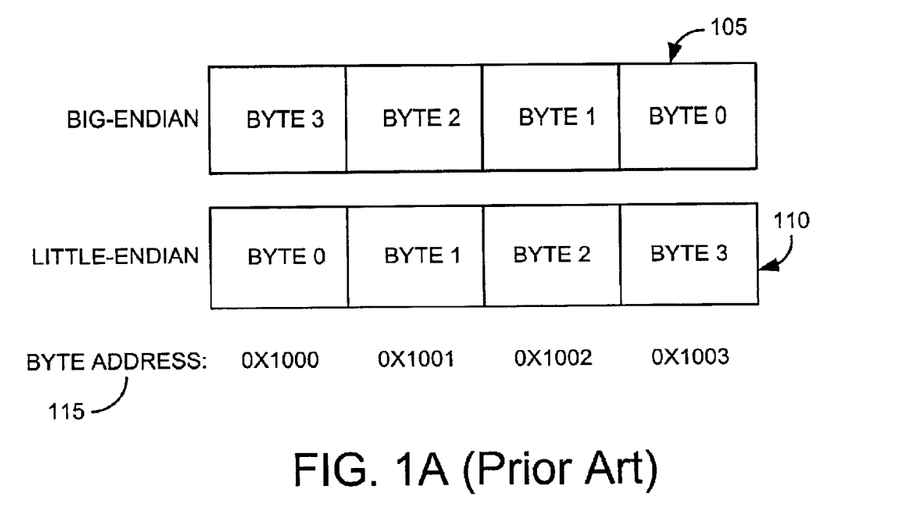
FIG. 1A is a diagram showing how byte ordering differs between big-endian and little-endian data storage conventions.
Figure 1B:
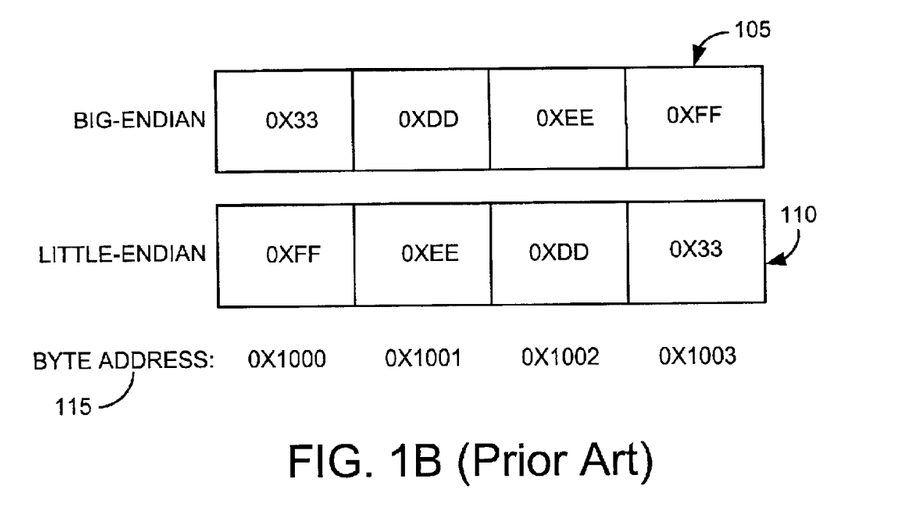
FIG 1B is a diagram comparing how a specific hexadecimal constant is stored in big-endian and little-endian formats, respectively.

FIG. 1A and FIG. 1B show the difference between the little-endian and big-endian data storage conventions and clarify the byte swapping aspect of the invention. As shown in FIG. 1A, the bytes comprising, for example, 32-bit word 105 stored in big-endian format are opposite in order of corresponding 32-bit word 110 stored in little-endian format. Byte addresses 115 indicate the order in which bytes are stored physically in memory. In both representations, "Byte 3" is the most significant byte in the word. FIG. 1B shows how a specific arbitrary hexadecimal constant, 0x33DDEEFF, is stored in memory in both big-endian and little-endian formats, respectively.

Figure 2A:
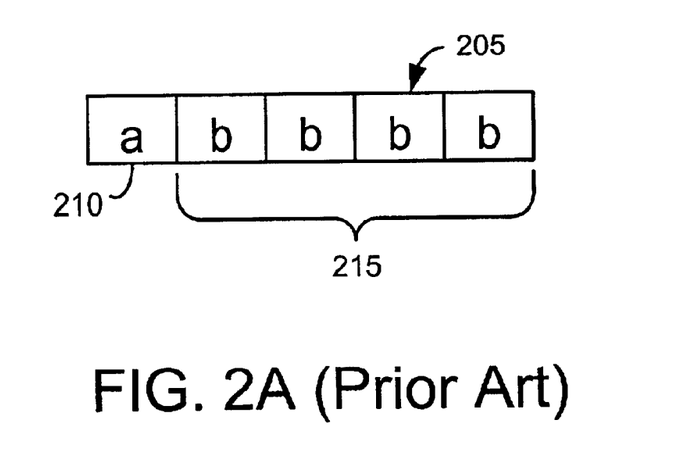
FIG. 2A is a diagram showing an example of a packed data structure.
Figure 2B:
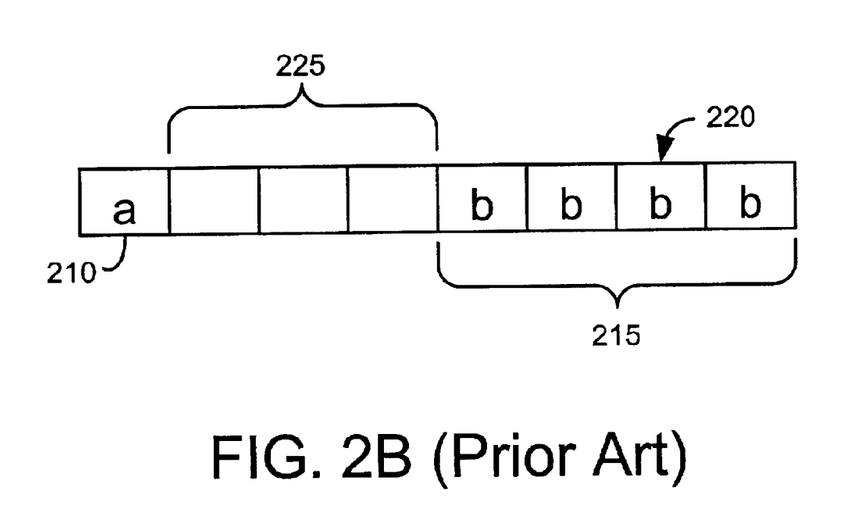
FIG. 2B is a diagram showing an example of an unpacked data structure.

FIG. 2A and FIG. 2B illustrate the difference between a packed and an unpacked data structure, respectively. In FIG. 2A, packed data structure 205 comprises 16-bit word "a" 210 and 64-bit word "b" 215 stored contiguously in memory, even though the word size of the host computer may be 32 bits. (Note that each cell in FIG. 2A and FIG. 2B represents 16 bits.) Data structures such as 205 are typically generated via a compile-time directive. If a compiler is used in which such a packing directive is unavailable, however, the same data structure may be stored in unpacked form, as shown in FIG. 2B. In FIG. 2B, unpacked data structure 220 comprises 16-bit word "a" 210, 64-bit word "b" 215, and 48-bit filler 225. Filler 225 is wasted in unpacked data structure 220 as a result of "a" 210 and "b" 215 being aligned with the 64-bit aligned addresses of a hypothetical computer (e.g., IA-64).

Figure 3A:
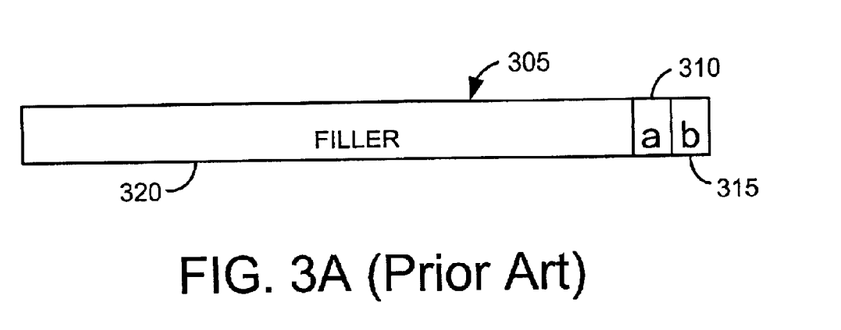
FIG. 3A is a diagram showing a bit field in little-endian format.
Figure 3B:
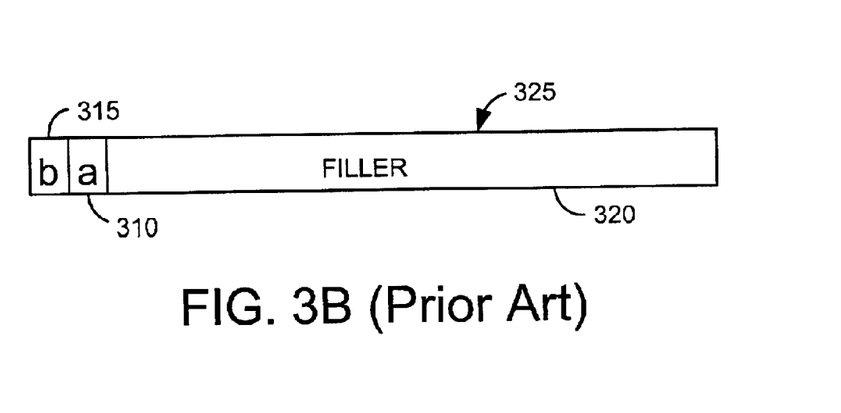
FIG. 3B is a diagram showing a bit field in big-endian format.

FIG. 3A and FIG. 3B illustrate the difference between bit fields stored in little-endian format and those stored in big-endian format. In FIG. 3A, little-endian data structure 305 comprises two bit fields "a" 310 and "b" 315. Filler 320 comprises the remaining unused bits in the word as a result of storing bit fields. FIG. 3B shows a big-endian equivalent 325 of the same data structure shown in FIG. 3A. When data is stored in little-endian format, a compiler associated with a big-endian computer may improperly interpret the physical location of "a" 310 and "b" 315.

Figure 4:
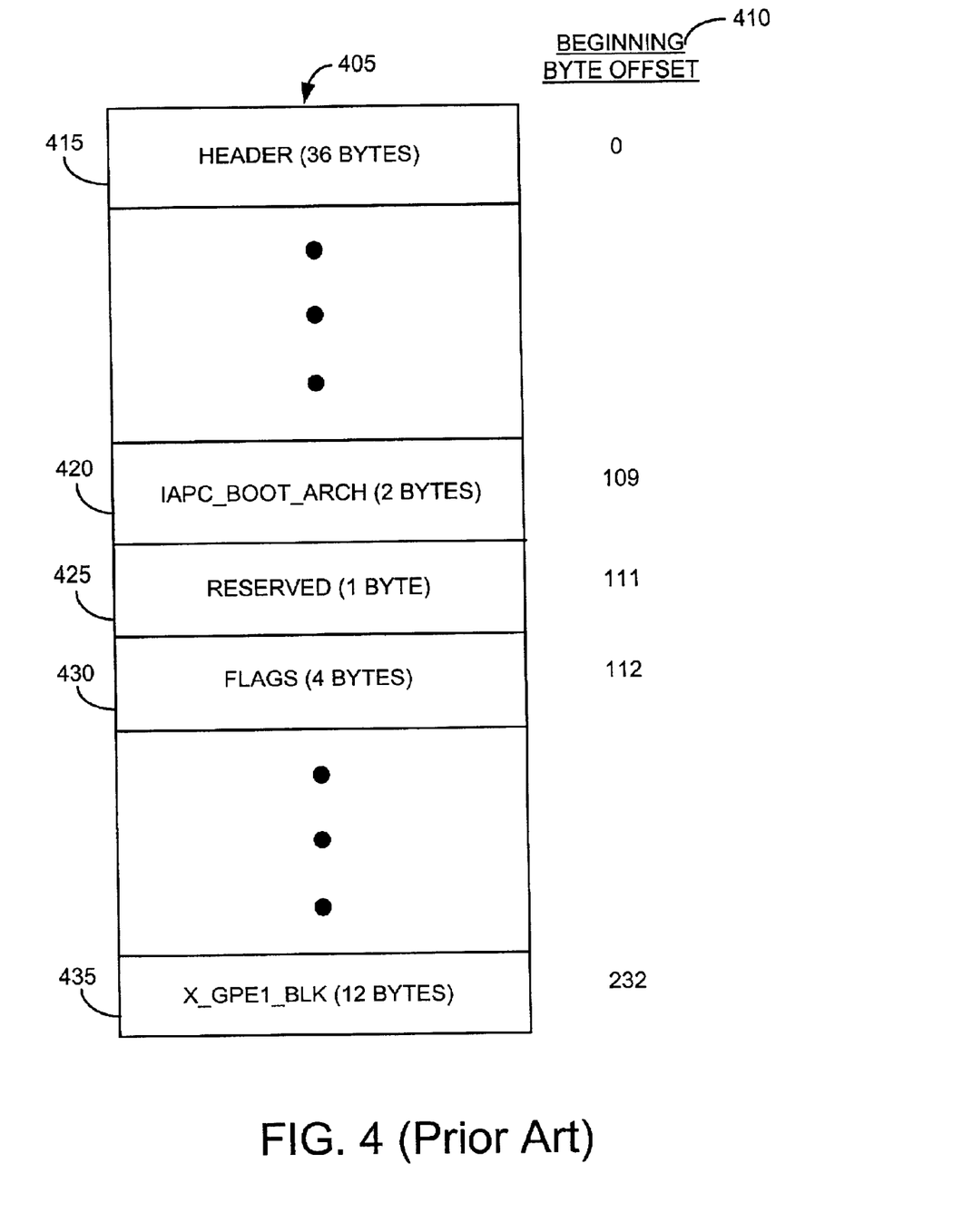
FIG. 4 is a diagram showing the structure of an exemplary ACPI table.

FIG. 4 is diagram showing, in simplified form, the structure of an exemplary ACPI table called the Fixed ACPI Description Table (FADT) from the A CPI v.2.0 Specification. FADT 405 comprises a plurality of data structures, each at a specific beginning byte offset 410. The first byte in FADT 405 has a beginning byte offset 410 of zero. ACPI tables such as FADT 405 are typically stored in firmware in little-endian format. Therefore, their data structures have a byte order opposite of the corresponding big-endian representation, as shown in FIGS. 1A and 1B. FADT 405 also contains packed data structures and bit fields. FADT 405 includes, among other data structures not shown in FIG. 4, 36-byte Header 415, two-byte data structure IAPC_BOOT_ARCH (Intel-Architecture-PC Boot Architecture Flags) 420, one-byte Reserved field 425, and four-byte Flags (Fixed Feature Flags) 430. FADT 405 ends with 12-byte data structure X_GPE1_BLK (Extended Address of the General-Purpose Event 1 Register Block) 435. A problem arises when a computer using aligned memory accesses (e.g., Intel-Architecture with 64-bit words or "IA-64") attempts to read a data structure such as IAPC_BOOT_ARCH 420. In a machine employing aligned memory accesses, the address of the data structure being accessed must be divisible by the size in bytes of the data structure being accessed. Since the two-byte data structure IAPC_BOOT_ARCH falls at a beginning byte offset of 109, which is not divisible by two, a computer using aligned memory accesses cannot properly access IAPC_BOOT_ARCH 420. This problem is further complicated when the program code running on the computer does not support a compile-time packing directive. In the context of a computer using aligned memory accesses, a data structure such as IAPC_BOOT_ARCH 420 is said to be misaligned. An ACPI table containing at least one misaligned data structure due to the packing of at least one data structure within the table will be referred to throughout this detailed description as a packed ACPI table. An ACPI table not containing any misaligned data structures will be referred to as an unpacked ACPI table. Flags 430 contain several bit fields that are read incorrectly by a big-endian computer due to their opposite bit order (refer to FIGS. 3A and 3B).

Figure 5:
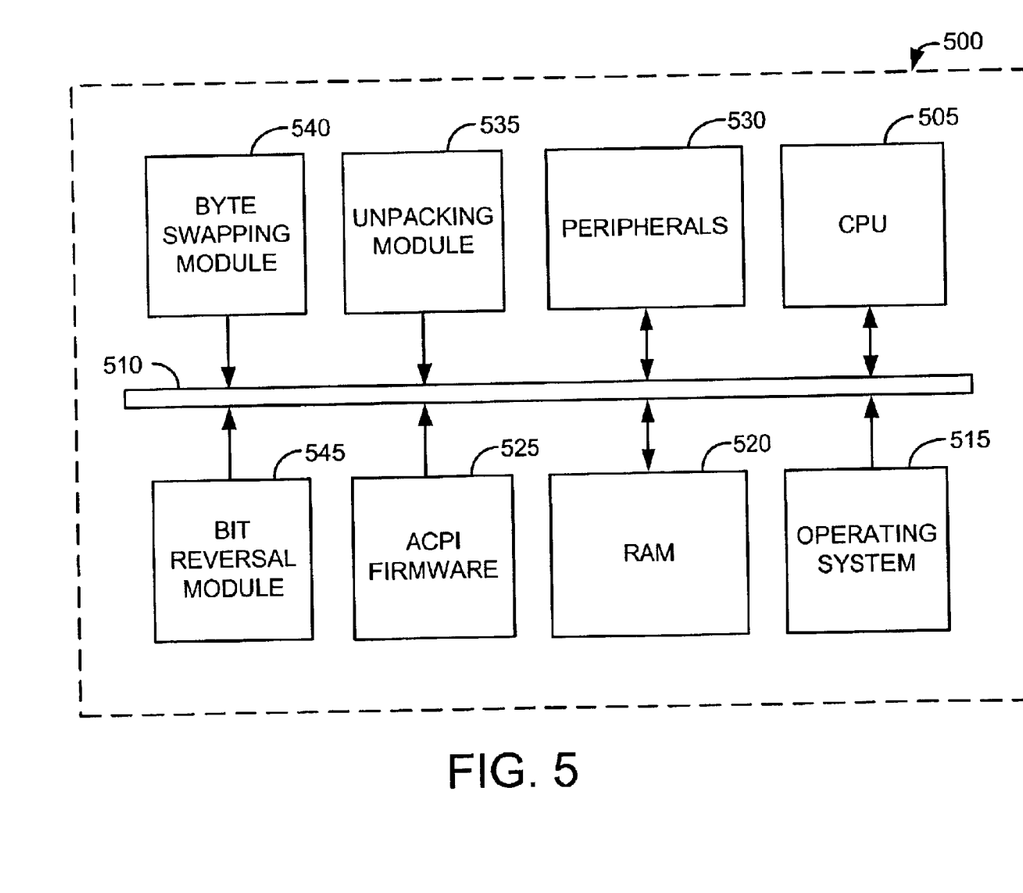
FIG. 5 is a simplified functional block diagram of a computer in accordance with an exemplary embodiment of the invention.

FIG. 5 is a simplified functional block diagram of a computer 500 in accordance with the invention. Computer 500 stores data in big-endian format and uses aligned memory accesses. Central processing unit (CPU) 505 is connected via data bus 510 with operating system 515, random access memory (RAM) 520, ACPI firmware 525, and peripherals 530. Operating system 515 further comprises unpacking module 535, byte swapping module 540, and bit reversal module 545. Although shown as distinct elements in FIG. 5, those skilled in the art will recognize that operating system 515 typically resides in RAM 520. Operating system 515 enforces the requirement that memory accesses be aligned, as explained previously. Peripherals 530 may include devices such as a keyboard, monitor, mouse, disk drives, scanner, printer, or digital camera. ACPI firmware 525 contains at least one, typically about ten, ACPI tables in packed, little-endian format. The firmware tables may be copied to RAM 520 for subsequent pre-processing. Each ACPI table comprises at least one data structure, which throughout this detailed description is defined to be any functional unit of data comprising at least one bit. Examples of data structures include a single byte, a multiple-byte word (often 32 or 64 bits), a multiple-member structure or record as defined in many high-level programming languages such as C and Pascal, a sub-structure within a larger structure, and a bit field. A bit field is a data structure comprising a single bit that typically specifies the state of a particular option or functions as a flag. However, since computers do not ordinarily manage single bits, a bit field is typically stored within a larger data structure such as a byte or word. The bits within the larger data structure that are not part of any bit field are simply wasted. Unpacking module 535, which will be explained more fully later in this detailed description, converts packed data structures contained within data collections such as ACPI tables to unpacked format. Byte swapping module 540 reorders the bytes of ACPI tables to convert them from little-endian format to big-endian format. That is, it reverses the order of the bytes in data structure. For example, byte swapping module 540 converts a data structure such as 32-bit word 110 in FIG. 1A to a data structure in the format of 32-bit word 105 in FIG. 1A. Because the specific method of reversing the byte order of a data structure may involve the pair-wise swapping of bytes (e.g., Bytes 0 and 3 in FIG. 1A), the process is sometimes referred to as "byte swapping." Of course, byte swapping is only necessary when a data structure is larger than one byte in size. Bit reversal module 545, which will be explained more fully later in this detailed description, reverses the bit order of data structures, particularly bit fields, contained within data collections such as ACPI tables.

Figure 6:
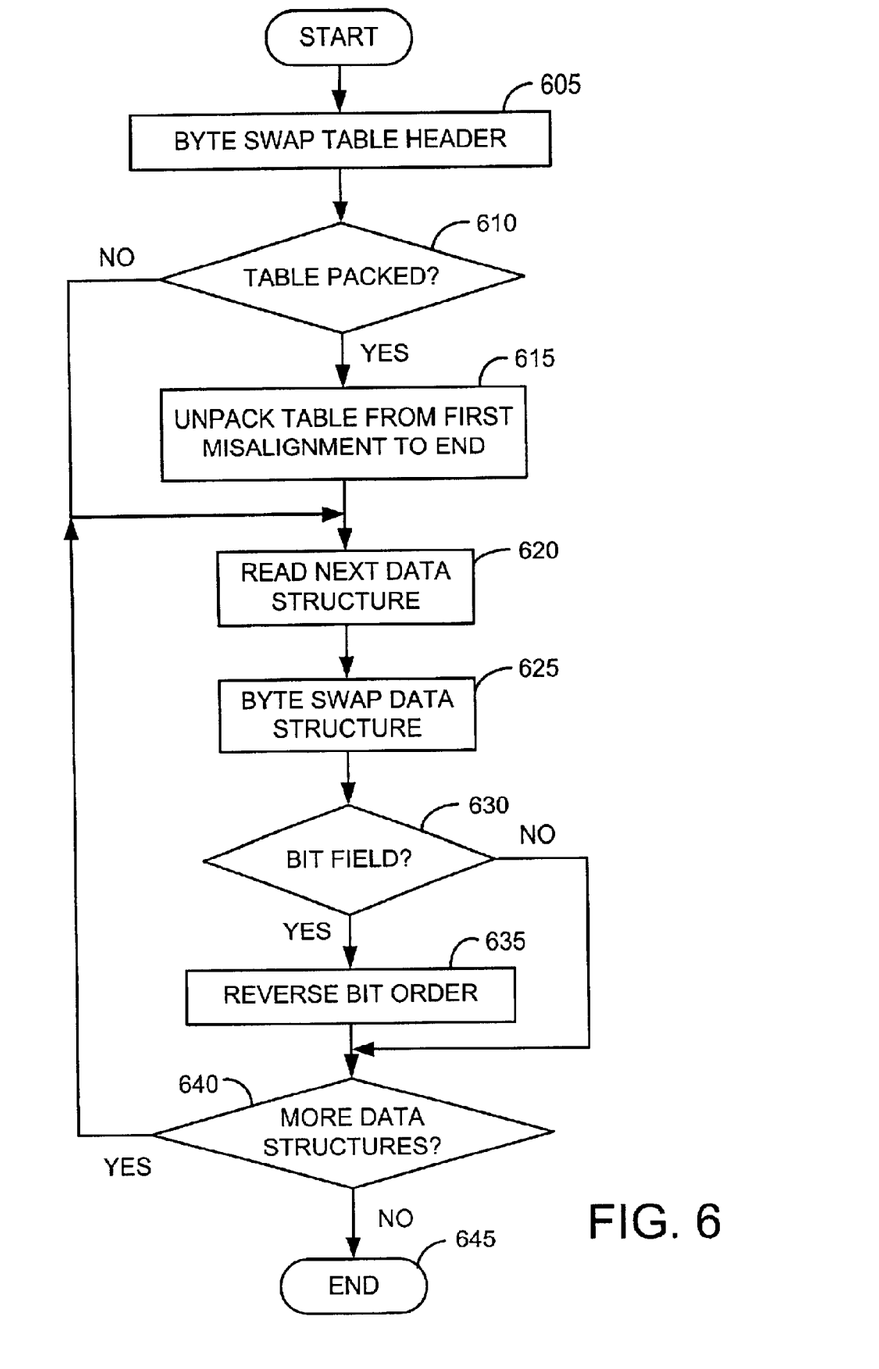
FIG. 6 is a flowchart showing the operation of the computer shown in FIG. 5 in accordance with an exemplary embodiment of the invention.

FIG. 6 is a flowchart showing the operation of computer 500 in accordance with an exemplary embodiment of the invention concerning ACPI tables. At 605, the table header appearing at the beginning of the ACPI table is optionally byte swapped by byte swapping module 540 as explained in the preceding paragraph. The table header comprises information about the data contained in the particular ACPI table. For example, the table header may define the names and sizes of the various data structures contained within the ACPI table. At 610, it is determined whether or not the particular ACPI being read is packed or unpacked. Packed ACPI tables may be identified a priori so that step 610 comprises simply looking up the packed or unpacked status of the ACPI table being read. If the table is packed, unpacking module 535 unpacks it at 615 from the first misaligned data structure in the table through as many subsequent data structures as the particular application requires. Optionally, the entire ACPI table may be unpacked subsequent to and including the first misaligned data structure, as indicated in FIG. 6. Unpacking essentially involves manipulating the data structures in memory to add filler bytes such that aligned memory access of the data structures is possible. In practice, only two ACPI tables (FADT and XSDT), as defined in the ACPI v.2.0 Specification, require unpacking. Further details regarding unpacking will be provided in a later portion of this detailed description. At 620, a loop begins in which the next data structure in the ACPI table subsequent to the table header is acquired. At 625, byte swapping module 540 byte swaps the current data structure, if it is larger than one byte, to convert it to big-endian format. If the test at 630 determines that the current data structure contains at least one bit field, bit reversal module 545 reverses the bits in the data structure at 635. If it is determined at 640 that more data structures are to be pre-processed, control returns to 620. Otherwise, the process terminates at 645.

The method shown in FIG. 6 may be implemented as program code residing on a computer-readable storage medium. For example, the program code may comprise a byte swapping program segment for reordering the bytes contained within a data structure, when the data structure is larger than one byte in size, and a bit reversal program segment for reversing the bits within the data structure, when the data structure contains at least one bit field. Optionally, the program code may include an unpacking program segment for converting the data structure from a packed to an unpacked storage format.

Figure 7:
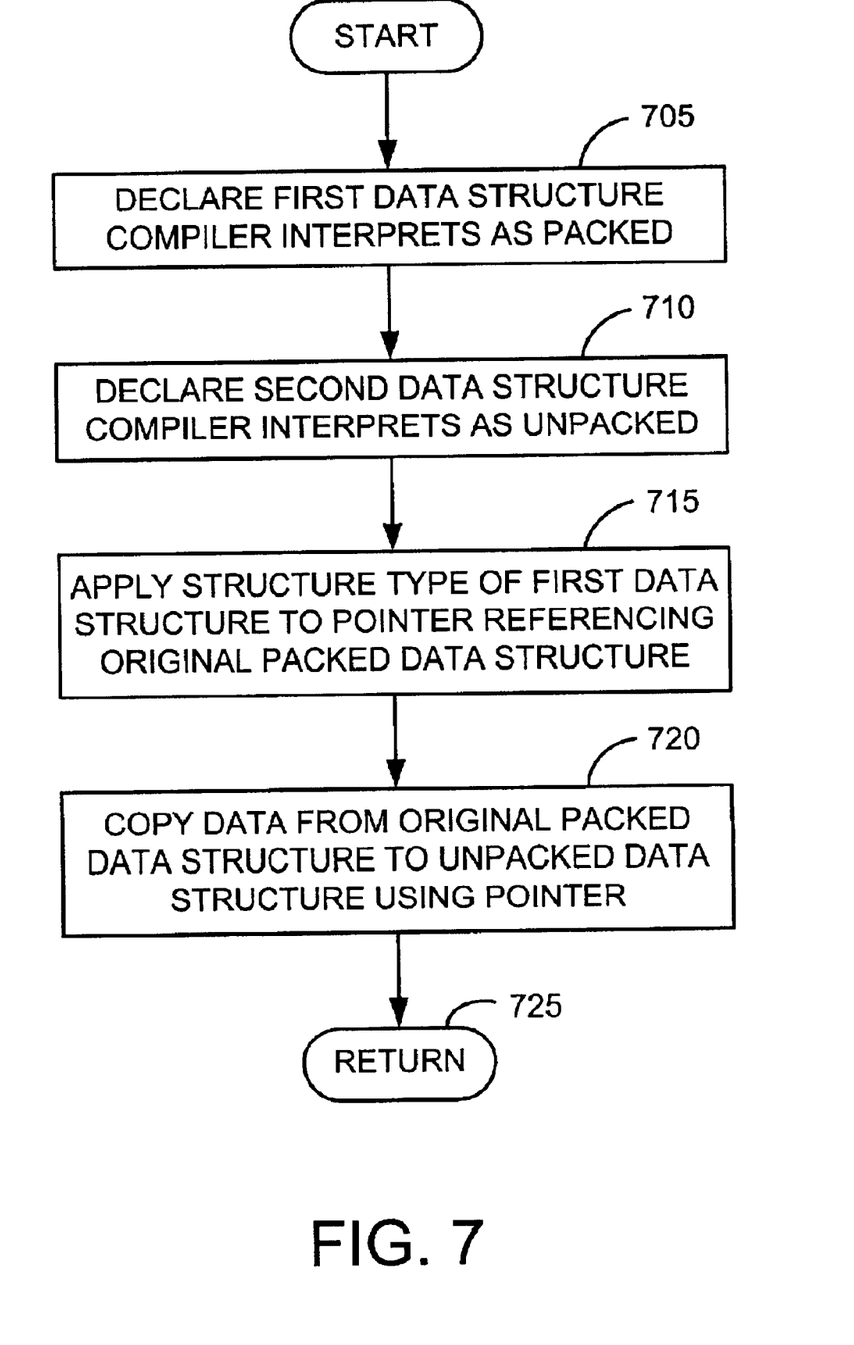
FIG. 7 is a flowchart showing an unpacking method in accordance with an exemplary embodiment of the invention.

FIG. 7 is a flowchart of an unpacking method in accordance with one aspect of the invention. The method of FIG. 7 may be used, for example, to unpack one or more data structures contained within a packed ACPI table. At 705, a first data structure is declared that a compiler, for example a C compiler, interprets as packed (refer to the earlier description associated with FIG. 2A and FIG. 2B for an explanation of packed versus unpacked data structures). At 710, a second data structure is declared that the compiler interprets as unpacked. At 715, the data type associated with the first data structure declared at 705 is applied to a pointer referencing the original packed data structure. That is, the compiler is directed to treat the data referenced by the pointer as if it were of the data type associated with the first data structure. In the C programming language, this may be accomplished by means of a cast, in which a data type is applied to another data structure having a different innate data type. For example, the C-language cast "(mystruct *)" directs the compiler to treat the object following the cast as a pointer to an object of data type "mystruct." At 720, the data is copied from the original packed data structure to the second, unpacked data structure using the pointer receiving the cast at 715. The pointer receiving the cast at 715 causes the compiler to treat data read from the original packed data structure at 720 as packed data so that it may be correctly copied to the second, unpacked data structure. Once the desired data has been copied, the method returns control to the calling program at 725.

The following example shows one manner in which the declaration of the first data structure at 705 in FIG. 7 may be implemented. Consider the following structure declaration in the C programming language:

```
struct mystruct {
    unsigned char a[2];
    unsigned char b[4];
};
```

In the foregoing declaration, the C structure "mystruct" comprises two members, a two-element array of unsigned characters ("a") and a four-element array of unsigned characters ("b"). The label "mystruct" also defines a data type that may be applied to other data structures using a cast. Unsigned character arrays are used for the members of "mystruct" because unsigned characters, being one byte in size, are always treated as packed by C compilers and are always aligned in computer architectures using aligned memory access. Specifically, the structure "mystruct" maps well to a packed data structure comprising a 16-bit integer "a" (a "short" in some C implementations) followed by a 32-bit integer "b" (a "long" in some C implementations), as illustrated in FIG. 2A. Casting a pointer to data type "mystruct" by means of the cast "(mystruct *)" and associating the pointer receiving the cast with a buffer within RAM 520 containing the original packed data structure forces the compiler to read correctly a packed data structure such as that shown in FIG. 2A. In this way, a compiler that ordinarily does not support packed data structures such as that shown in FIG. 2A may be forced to copy correctly the data to the second, unpacked data structure, such as that shown in FIG. 2B.

The method shown in FIG. 7 may be implemented as program code residing on a computer readable storage medium. For example, the program code may comprise a first program segment declaring a first data structure that a compiler interprets as a packed data structure, a second program segment declaring a second data structure that the compiler interprets as an unpacked data structure, a third program segment applying the data type associated with the first data structure to a pointer that references the packed data structure, and a fourth program segment copying the computer data from the packed data structure to the second data structure using the pointer.

Figure 8:
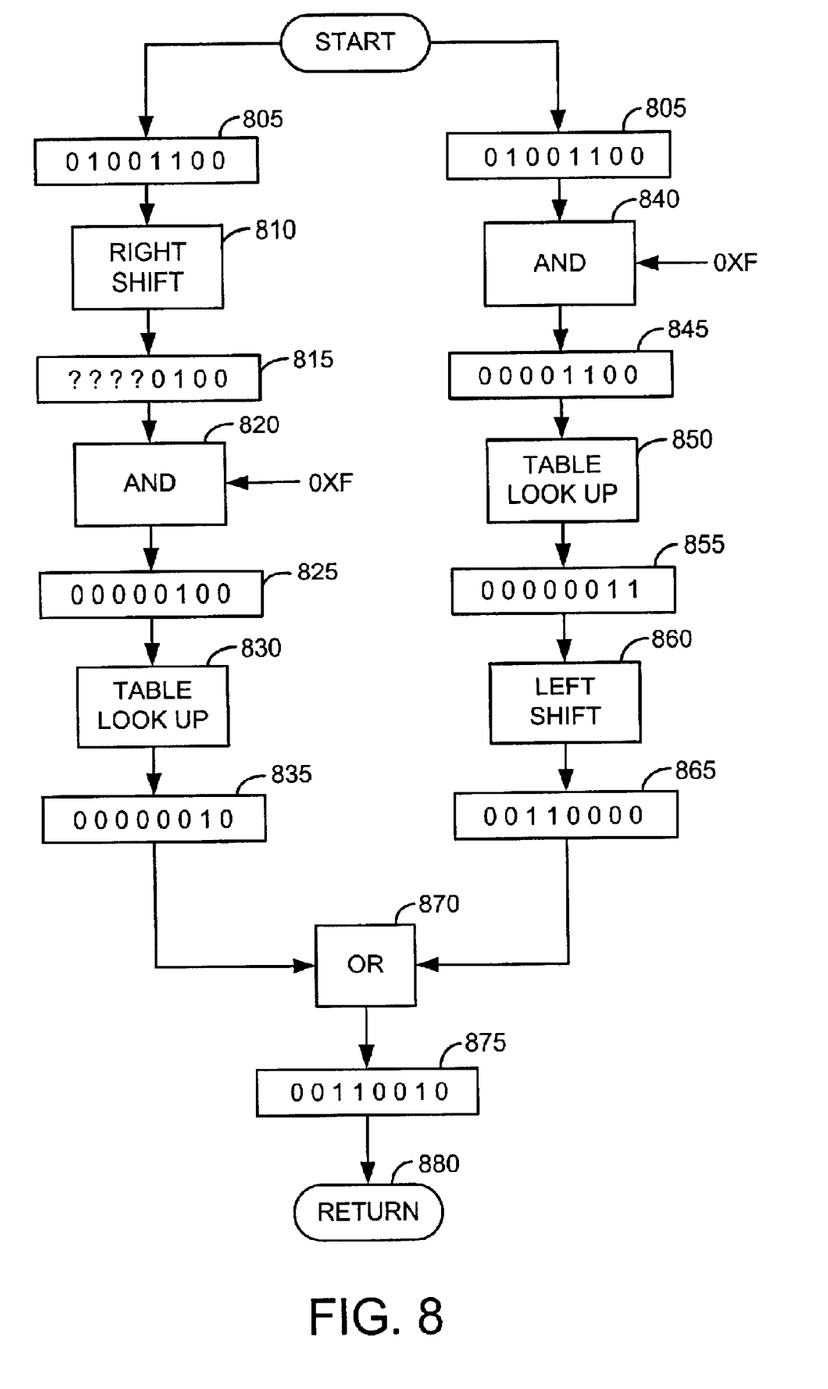
FIG. 8 is a diagram showing the operation of a method for reversing the bits within a bit group in accordance with an exemplary embodiment of the invention.

FIG. 8 is a diagram showing the operation of a method for reversing the bits within a bit group in accordance with another aspect of the invention. The method shown in FIG. 8 generalizes to any bit group that can be sub-divided into two bit sub-groups of at least two bits each. The bit sub-groups need not be of equal size. In the particular embodiment shown in FIG. 8, a bit group is a byte, and the byte is divided into two four-bit nibbles. At 805, a byte to be bit reversed is received. The byte is shifted to the right by four bits at 810, which causes the high-order nibble to occupy the lower-order nibble position and renders the high-order nibble indeterminate. The result at 815 is logically bit-wise ANDed with the eight-bit hexadecimal constant 0xF at 820. The result at 825 contains zeroes in the high-order nibble and the high-order nibble of the original byte received at 805 in the low-order-nibble position. At 830, the result from 825 is used to address a look-up table comprising bit patterns corresponding to the lower-order nibble of the look-up table address (array index) in reverse bit order and zeroes in the high-order nibble. For example, such a look-up table may be declared in the C programming language as follows:

```
static unsigned char lookuptable[16]={0, 0x8, 0x4, 0xc, 0x2, 0xa,
    0x6, 0xe, 0x1, 0x9,0x5, 0xd, 0x3, 0xb, 0x7, 0xf};
```

This table look-up at 830 returns the first intermediate result shown at 835, in which the lower-order nibble of the result at 825 has been bit reversed. The original byte received at 805 is also logically bit-wise ANDed with the hexadecimal constant 0xF at 840 to produce the result at 845, in which the high-order nibble has been set to zeroes while preserving the original low-order nibble. At 850, a table look up analogous to that at 830 is performed to return a bit-reversed lower-order nibble with zeroes in the high-order nibble at 855. The result at 855 is shifted to the left by four bits at 860 to produce a second intermediate result at 865. Finally, the first and second intermediate results at 835 and 865 are logically bit-wise ORed at 870 to produce the original byte received at 805 in reverse bit order at 875. At 880, control is returned to the calling program.

The method shown in FIG. 8 may be implemented as program code residing on a computer-readable storage medium. For example, the program code may comprise a first program segment configured to isolate the first bit sub-group within the bit group, a second program segment configured to obtain a bit-reversed first bit sub-group by addressing a look-up table using the isolated first bit sub-group, a third program segment configured to isolate the second bit sub-group within the bit group, a fourth program segment configured to obtain a bit-reversed second bit sub-group by addressing the look-up table using the isolated second bit sub-group, and a fifth program segment configured to combine the bit-reversed first bit sub-group and the bit-reversed second bit sub-group to generate a bit-reversed bit group. Additionally, a sixth program segment may be provided that is configured to apply the first, second, third, fourth, and fifth program segments to each of a plurality of bit groups. For example, the sixth program segment may be configured to apply the first, second, third, fourth, and fifth program segments to a 32-bit (four-byte) word.

Figure 9:
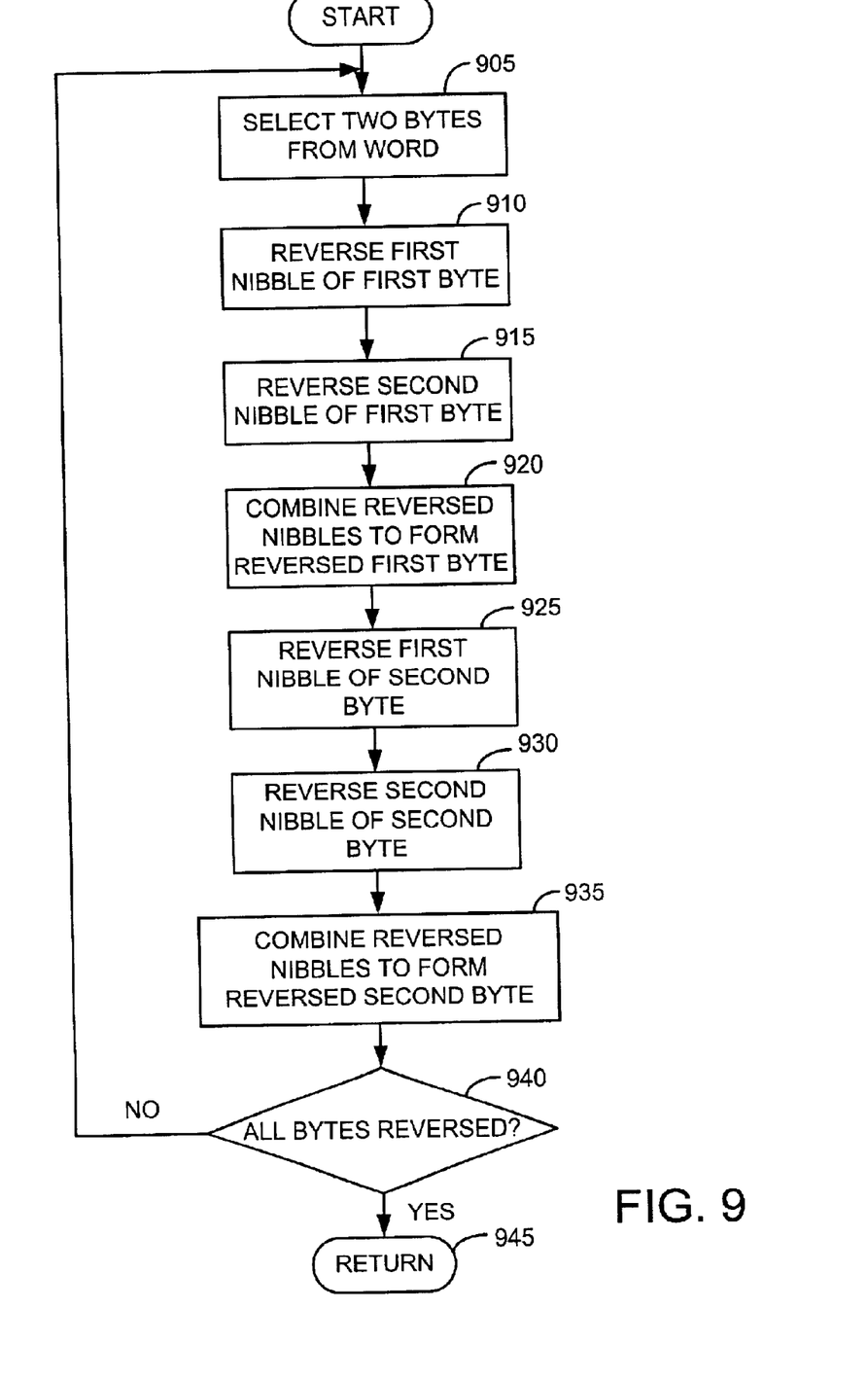
FIG. 9 is a flowchart showing the operation of a method for reversing the bits within a bit group in accordance with another exemplary embodiment of the invention.

FIG. 9 is a flowchart showing one manner in which the bit reversal method described in the preceding paragraph and embodied in FIG. 8 may be extended to any computer word with an even number of bytes. In this particular embodiment, a bit group is one byte and a bit sub-group is a nibble (four bits). In FIG. 9, the reversal of individual bytes within the word may be performed using the method shown in FIG. 8 or any an equivalent method. At 905, two bytes are selected from the word. The first nibble of the first byte is bit reversed at 910. At 915, the second nibble of the first byte is bit reversed. The bit-reversed first and second nibbles are combined at 920 to form a bit-reversed first byte. Steps 925, 930, and 935 (analogous to steps 910, 915, and 920) are performed on the second byte selected at 905 to form a bit-reversed second byte. At 940, it is determined whether all bytes comprising the word have been bit reversed. If not, control returns to 905, where two new bytes are selected for bit reversal. If so, control is returned to the calling program at 945. One advantage of the method shown in FIG. 9 is that two bytes are bit reversed in each pass through a loop of program instructions implementing the method, thereby speeding up the process of reversing bit order. Those skilled in the art will recognize, however, that many variations of the method shown in FIG. 9 are possible. For example, all the bytes comprising the word may be reversed in a single pass through a loop of program instructions instead of two at a time. As discussed in connection with FIG. 8, the method of FIG. 9 may also be implemented as program code residing on a computer-readable storage medium.

The foregoing description of the present invention has been presented for the purposes of illustration and description. It is not intended to be exhaustive or to limit the invention to the precise form disclosed, and other modifications and variations may be possible in light of the above teachings. The particular embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for transferring computer data from a packed data structure to an unpacked data structure, the method comprising:

(a) declaring a first data structure that a compiler interprets as a packed data structure, the first data structure having an associated data type;

(b) declaring a second data structure that the compiler interprets as an unpacked data structure;

(c) applying the data type associated with the first data structure to a pointer that references the packed data structure; and (d) copying the computer data from the packed data structure to the second data structure using the pointer.

2. The method of claim 1, wherein step (c) comprises a cast.

3. The method of claim 1, wherein the packed data structure comprises at least two members of unequal size.

4. The method of claim 1, wherein the packed data structure comprises at least one sub-structure and steps (a)–(d) are performed for the at least one sub-structure.

5. The method of claim 1, wherein the first data structure comprises at least one member having an unsigned character data type.

6. A computer-readable storage medium containing program code for transferring computer data from a packed data structure to an unpacked data structure, comprising:

a first program segment that declares a first data structure, the first data structure having an associated data type, the first data structure being interpreted by a compiler as a packed data structure;

a second program segment that declares a second data structure, the second data structure being interpreted by the compiler as an unpacked data structure;

a third program segment that applies the data type associated with the first data structure to a pointer that references the packed data structure; and a fourth program segment that copies the computer data from the packed data structure to the second data structure using the pointer.

7. The computer-readable storage medium of claim 6, wherein the third program segment comprises a cast.

8. The computer-readable storage medium of claim 6, wherein the unpacked data structure comprises at least one sub-structure and the first, second, third, and fourth program segments are applied to the at least one sub-structure.

9. The computer-readable storage medium of claim 6, wherein the first data structure comprises at least one member having an unsigned character data type.

* * * * *